United States Patent
Dessert et al.

(10) Patent No.: US 6,257,071 B1
(45) Date of Patent: Jul. 10, 2001

(54) FLUOROPOLYMER COATED VORTEX FLOWMETER

(75) Inventors: Wayne A. Dessert, Rehoboth; Khoren Keusseyan, Arlington, both of MA (US)

(73) Assignee: Foxboro Company, Foxboro, MA (US)

( * ) Notice: Subject to any disclaimer, the term of this patent is extended or adjusted under 35 U.S.C. 154(b) by 0 days.

(21) Appl. No.: 09/221,509

(22) Filed: Dec. 28, 1998

(51) Int. Cl.⁷ .................................................. G01F 1/32
(52) U.S. Cl. ................................... 73/861.22; 73/861.24
(58) Field of Search .......................... 73/861.22, 861.24

(56) References Cited

U.S. PATENT DOCUMENTS

| | | | |
|---|---|---|---|
| 3,775,673 | * 11/1973 | Watanabe | 73/861.22 |
| 3,972,232 | * 8/1976 | Miller et al. | 73/861.24 |
| 3,996,796 | * 12/1976 | Adler et al. | 73/861.22 |
| 4,201,084 | * 5/1980 | Ito et al. | 73/861.22 |
| 4,220,046 | 9/1980 | Sqourakes | 73/861.22 |
| 4,329,879 | 5/1982 | Appel et al. | 73/861.12 |
| 4,565,619 | 1/1986 | Gardner et al. | 204/400 |
| 4,578,427 | 3/1986 | Saito et al. | 525/150 |
| 4,718,283 | 1/1988 | Kamentser | 73/861.22 |
| 4,773,275 | 9/1988 | Kalinoski | 73/861.12 |
| 4,792,117 | 12/1988 | Kubota | 251/315 |
| 4,897,439 | 1/1990 | Rau et al. | 524/404 |
| 5,078,004 | 1/1992 | Nyseth | 73/861.55 |
| 5,093,403 | 3/1992 | Rau et al. | 524/404 |
| 5,209,125 | 5/1993 | Kalinoski et al. | 73/861.24 |
| 5,224,394 | 7/1993 | Kalinoski | 73/861.12 |
| 5,458,004 | 10/1995 | Van der Pol | 73/861.29 |
| 5,536,583 | 7/1996 | Roberts et al. | 428/457 |
| 5,595,206 | 1/1997 | Soria Vega | 137/15 |

* cited by examiner

*Primary Examiner*—Harshad Patel
(74) *Attorney, Agent, or Firm*—Foley, Hoag & Eliot llp; Kevin A. Oliver; W. Hugo Liepmann (57) ABSTRACT

The invention relates to a vortex flow meter for ultra pure applications. The vortex flow meter of the invention employs a smooth and continuous fluorocarbon layer to coat a number of fluid accessible surfaces of the flowmeter. The coating prevents or minimizes contact between the process fluid and the fluid accessible surfaces of the flowmeter, thus allowing the flow meter to measure the flow rate of a process fluid having a level of purity of typically one part per trillion without contaminating the fluid. The flowmeter of the invention is advantageously less costly and more accurate than conventional flow meters for ultra pure applications.

11 Claims, 6 Drawing Sheets

FLUOROPOLYMER COATED VORTEX FLOWMETER

BACKGROUND OF THE INVENTION

This invention relates generally to apparatus and methods for measuring flow rates of fluids. In particular, the invention relates to an improved vortex flowmeter for ultra-pure applications. Such applications require that the flow-meter not introduce contaminants to the fluid flow being measured.

Vortex flowmeters measure the rate of flow of a fluid, termed a process fluid, by measuring the frequency of artificially induced vortices in the fluid. Such flowmeters are known in the art, and include those marketed by The Foxboro Company, Foxboro, Mass., U.S.A ("Foxboro"), for example, under the trade designation 83. Another example of a vortex flow meter known in the art can be found in U.S. Pat. No. 4,220,046, herein incorporated by reference. Vortex flowmeters are popular because of their relatively high accuracy and wide dynamic range. In addition, many vortex flow meters can operate in extreme temperatures, for example up to 800° F. The term "ultrapure applications" herein refers to applications in which the process fluid has a purity of typically in the order of one part per trillion ("PPT").

Vortex flowmeters typically have a tubular passage, such as a pipe, for guiding the process fluid, and have a vortex shedder, also termed a bluff body, interposed in the path of fluid flow. The vortex-shedder creates a series of spaced vortices downstream in the flowing fluid. Under certain conditions, the vortex shedder creates two nearly-parallel rows of spaced vortices on opposite sides of the shedder. These vortices are known in the art as a Von Karman vortex street. The vortices in one row are staggered with respect to the vortices in the other row. It is understood that the frequency of these generated vortices is linearly proportional to the average flow velocity of the fluid. Thus, a measurement of the frequency of the vortices provides a measure of the average flow velocity. A vortex-responsive sensor detects the pressure fluctuations associated with the passage of the vortices and drives an electronic unit that determines the frequency of the vortices, to determine the flow velocity of the fluid.

The process fluid contacts many exposed surfaces of the vortex flow meter, such as surfaces of the tubular passage, of the vortex shedder, and of the sensor, as it passes through the instrument. In applications where the process fluid is ultra-pure, there is a risk of contamination of the process fluid as a result of such contact of the process fluid with fluid accessible surfaces of the flow meter.

It is known in the art to polish the fluid accessible surfaces of a vortex flowmeter to a surface smoothness typically of at least a No. 4 mill finish. Such smoothness of the fluid accessible surfaces diminishes entrapment of the process fluid in the surfaces, and diminishes contamination of the fluid as a result of the fluid removing particles from surfaces of the instrument. In addition to the described degree of smoothness of the surfaces, traditionally all inside angles between the various fluid accessible surfaces of a vortex flow meter are configured to be either greater than 135 degrees or rounded with a radius of curvature of at least 0.25 inches (0.635 cm).

It is costly and time-consuming to attain these stringent requirements regarding the smoothness of the surfaces and regarding the angles between the surfaces of a traditional vortex flowmeter for sanitary applications. Another disadvantage of polishing the fluid accessible surfaces of a vortex flow meter to the degree necessary for ultra-pure applications is that such a polishing typically results in some distortion of the contours of the vortex shedder. Such distortions typically degrade the accuracy of the measurement of the flow velocity of the fluid.

It is thus desirable to provide a vortex flow meter that meets the requirements for ultra-pure applications, and that is easier and less costly to produce than present vortex flow meters for ultra-pure applications.

It is another object of the invention to provide a vortex flow meter for ultra-pure applications that is at least equally as accurate as vortex flow-meters for other applications.

It is another object of the invention to provide a vortex flowmeter for ultra-pure applications that does not require a smoothness of its fluid accessible surfaces to the degree presently deemed necessary.

It is yet another object of the invention to provide a flowmeter whose fluid accessible surfaces do not entrap the process fluid.

SUMMARY OF THE INVENTION

The invention attains the foregoing and other objects by providing a vortex flowmeter that has a continuous and smooth fluorocarbon layer coating on a number of its fluid accessible surfaces. This coating diminishes, if not prevents, contamination of the process fluid due to contact with the instrument surfaces, and yet preserves accurate flow-measuring operations of the flow-meter. A flowmeter according to the invention has a pipe having a tubular passage for containing a fluid flow to be measured, and has a flow obstruction element disposed at least partly in the tubular passage for producing two streams of spaced vortices. A sensor element, disposed downstream from the induced vortices, produces a set of electrical signals in response to passage of the vortices. An electronic module, which can be separate from the flow meter and connected to it electronically, receives these electrical signals to calculate the frequency of the vortices, for measuring the flow velocity of the fluid. The obstruction element, the tubular passage, and the sensor element, have fluid accessible surfaces. The term fluid-accessible surfaces refers to those surfaces of the flow meter that are in contact with the process fluid in absence of the fluorocarbon layer coating. The polymer coating which the invention provides covers the fluid-accessible surfaces of the obstruction element, and of the tubular passage.

The vortex-type flowmeter of the invention meets the exacting purity requirements for use in ultra-pure applications, and thus is suited for such applications. For example, the flowmeter of the invention can be utilized in a variety of semiconductor applications for measuring the flow rate of ultra-pure water without contaminating the water. The invention prevents or minimizes contact between the process fluid and the fluid accessible surfaces of the tubular passage and of the shedder of the vortex flowmeter by coating all such surfaces with the fluorocarbon polymer layer. The coating of these fluid accessible surfaces allows the flowmeter to measure the flow rate of a process fluid having a level of purity of typically one part per trillion ("PPT") without contaminating the fluid.

The fluorocarbon polymers that the invention employs for coating the fluid accessible surfaces of the vortex flowmeter are known in the art for other uses. For example, U.S. Pat. No. 5,093,403, herein incorporated by reference, describes a variety of polymers that are suited for the practice of the present invention. The invention preferably employs perfluoroalkoxy tetrafluoro ethylene copolymer resin ("PFA") admixed with an additive selected from the group consisting of a nitride, an oxide, a diboride, and a carbide of silicon, of zirconium, of tungsten, of boron, or of a polyether. Perfluoroalkoxy tetrafluoro ethylene copolymer resin is commercially available, such as the TEFLON-P 532-5012 PFA powder resin available from E. I. Dupont de Numours & Company, Inc. of Wilmington, Del., U.S.A. Further, the invention preferably admixes the PFA with silicon carbide ("SiC") to obtain the desired coating composition. One preferred resin for the practice of the invention is a PFA-based composite sold by Edlon Products, Inc., Pennsylvania, U.S.A., under the designation SC-7005.

One aspect of the invention relates to manufacturing a vortex flowmeter that requires less, if any, polishing of its fluid accessible surfaces before application of the fluorocarbon coating. In contrast, present-day vortex flowmeters utilized for measuring flow rates of ultra-pure process fluids require extensive polishing of their fluid-accessible surfaces. In particular, whereas the fluid accessible surfaces of present vortex flowmeters for ultra-pure applications require a smoothness of at least a No. 4 mill finish, the fluid accessible surfaces of the present invention typically have a smoothness of stock stainless tubing or cast surfaces. The coating of the fluid accessible surfaces with a fluorocarbon layer, preferably PFA, according to this invention results in less stringent requirements for the degree of smoothness of the surfaces, thus rendering the construction of the flowmeter of the invention significantly less costly than that of the present flowmeters for ultra-pure applications, and also shortening the manufacturing time. Further, coating the fluid accessible surfaces in accord with the invention obviates the need for polishing the surfaces. Accordingly, the coated flowmeters according to the present invention do not suffer from a loss of accuracy due to such polishing.

The vortex shedder of the vortex flow meter of the invention typically has a blunt face that partially obstructs the flow of the process fluid, thus inducing vortices in the fluid. If the flow velocity exceeds a certain threshold, the induced vortices detach from the shedder and move downstream. Because the frequency of the vortices is proportional to the flow velocity of the fluid, a measurement of the frequency of the vortices can determine the flow velocity of the fluid.

The vortex shedder also typically includes a "tail" portion, attached to the blunt face, that has a tapered edge. It is understood that the tail portion stabilizes the formation of the vortices, and hence increases the accuracy of the flow velocity measurement. The high degree of polishing of fluid accessible surfaces of traditional vortex flow meters typically results in a change in the contours of the edge of the tail portion of the flowmeter with a concomitant loss of measurement accuracy. In contrast, the present invention provides the vortex shedder with a continuous and smooth coating that has a sufficiently small thickness, typically a few millimeters, that preserves the contours of the shedder. Thus, the flowmeter of the invention attains a more accurate flow velocity measurement than traditional vortex flow meters for ultra-pure applications, and at a lower cost.

The invention preferably employs the methods disclosed in U.S. Pat. No. 5,093,403, herein incorporated by reference, to coat the fluid-accessible surfaces of the flowmeter. These methods include electrostatic spraying of the fluid-accessible surfaces with a powder mixture of PFA and silicon carbide while holding the temperature of the surfaces above the melting temperature of the mixture. Alternatively, the invention employs a wet spraying technique, also disclosed in the '403 patent, to coat the surfaces with a layer of PFA. The '403 patent describes the steps of such a wet spraying process in detail. It is to be understood, however, that the practice of the invention can utilize any method that coats the fluid-accessible surfaces continuously and smoothly with a layer of a fluorocarbon polymer.

These and other features of the invention are more fully set forth below with reference to the detailed description of illustrated embodiments, and the accompanying figures in which like numerals refer to like elements.

ILLUSTRATED EMBODIMENTS

Figure 1:
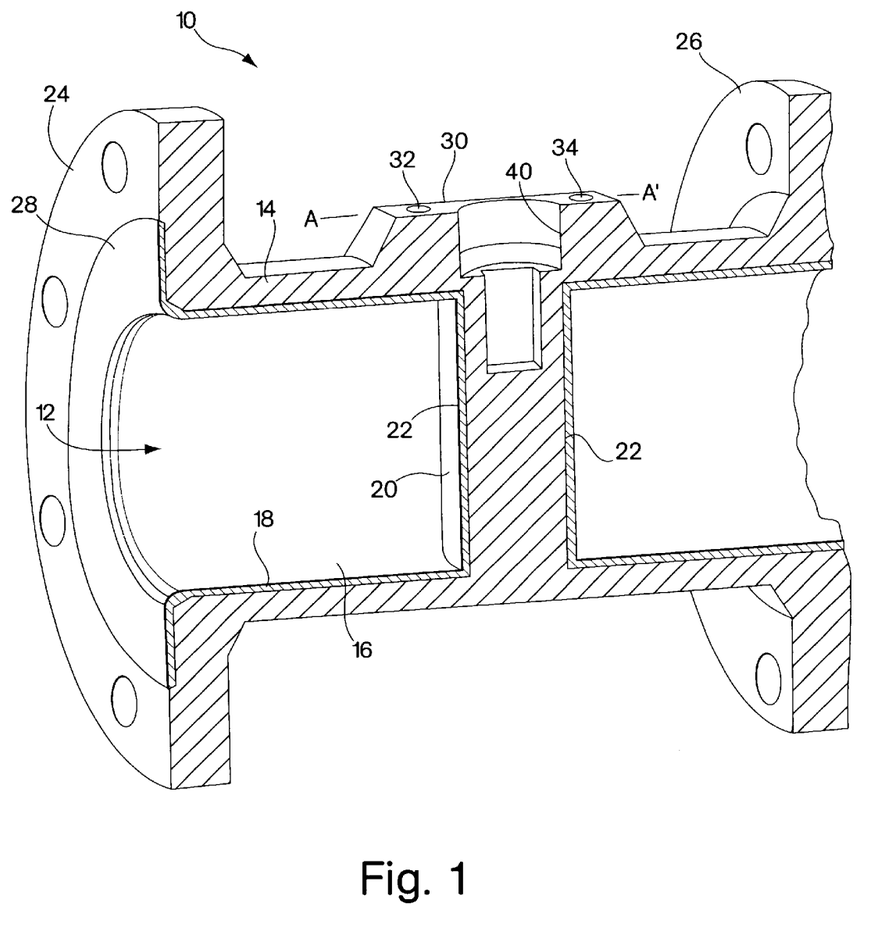
FIG. 1 is a cut away view of the tubular passage, the vortex shedder, and the sensor of one vortex flow meter according to the invention and in which all fluid accessible surfaces of the tubular passage and of the shedder are coated continuously and smoothly with a fluorocarbon layer.

FIG. 1 shows that one vortex flow meter 10 according to the invention has a tubular passage 12, formed by a stainless steel pipe or a cast flow tube, for guiding a process fluid (not shown). The pipe that forms the tubular passage 12 has an outer surface 14 and an inner surface 16 that is accessible to the process fluid. A liquid-impervious fluorocarbon layer 18, preferably PFA, coats the inner surface 16 of the tubular passage 12 smoothly and continuously. As described previously, traditional vortex flow meters for ultra-pure applications require a high degree of polishing of their fluid accessible surfaces. The surface 16, however, does not require such a high degree of polishing because the fluorocarbon layer prevents contamination of the process fluid due to contact with the inner surface 16.

Further reference to FIG. 1, the illustrated flowmeter has a vortex shedder 20, disposed in the tubular passage 12 and extending perpendicular to the direction of fluid flow thereon. The fluid flow is along the axial direction, and a direction perpendicular to the axial direction is termed the radial direction. The illustrated vortex shedder 20 spans the entire inner diameter of the tubular passage 12. In the preferred embodiment shown, the tubular passage and the vortex shedder form an integral unit, for example by integrally casting the shedder and the tube. In an alternative construction (not shown), the shedder 20 is welded to the flow tube that forms the passage 12 according to known practices. The shedder provides an obstruction to the fluid flow, to produce two streams of vortices as described more fully below. A layer 22 of PFA covers all the fluid-accessible surfaces of the shedder to form a barrier between these surfaces and the process fluid. The layer 22 is preferably continuous with the layer 18, forming therewith a single unitary coating.

FIG. 1 also illustrates that the flow tube has two end flanges 24 and 26 that allow the flowmeter to mate with systems that receive and/or provide the process fluid. The invention coats surface portions of the two flanges which are accessible, or partially accessible, to the process fluid with the same continuous layer of PFA that forms the layers 18 and 22. In particular, FIG. 1 shows a coated portion 28 of the flange 24. Although not shown in FIG. 1, the flange 26 also has a fluid-accessible portion corresponding to that of flange 24, and that is similarly coated with a layer of PFA.

Figure 2A:
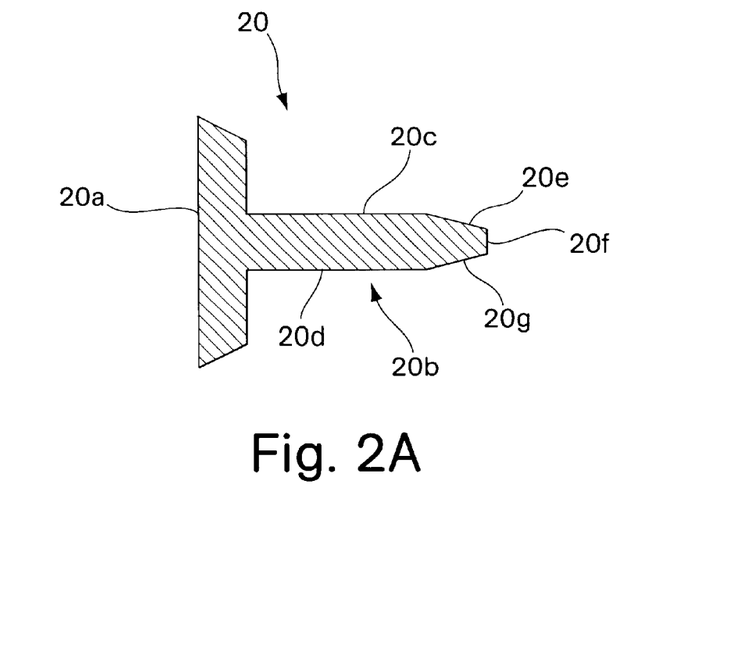
FIG. 2a is a top view, along section line AA', of the vortex shedder of the flowmeter of FIG. 1, and illustrates the blunt surface and the tail portion of the shedder.

The structure and operation of the shedder 20 are further explained with reference to FIGS. 2a and 2b. The illustrated cross-section of the shedder 20 has a generally "T" shape with a fluid accessible blunt face 20a, and a tail 20b. The tail 20b forms a number of fluid accessible surfaces, i.e., a pair of spaced and parallel surfaces 20c and 20d, a pair of tapered and converging surfaces 20e and 20g, and a blunt trailing surface 20f. The surfaces 20e, 20f, and 20g of the tail form a tapered edge. The shape of the tail, including its tapered edge, stabilizes the formation of the vortices. U.S. Pat. No. 3,972,232, herein incorporated by reference, discloses a vortex shedder similar to the vortex shedder 20. Accordingly, the vortex shedder of the '232 patent is an example of a vortex shedder that can be employed in the present invention.

In further accord with the invention, all the fluid accessible surfaces of the shedder 20 are coated with a continuous layer of a fluorocarbon polymer, preferably PFA. The coating prevents contamination of the process fluid due to contact with these surfaces. The coating is sufficiently thin, preferably a few millimeters thick, to preserve the contours of the shedder, thus ensuring that there is no loss of accuracy of the flow velocity measurement due to changes in the contours of the shedder. The polymer coating 18, 20, 28 is continuous, as stated, and is impervious, throughout the flowmeter, to the process fluid. It hence constitutes a secure barrier that isolates the process fluid from the flowmeter surfaces that otherwise are fluid accessible.

Figure 2B:
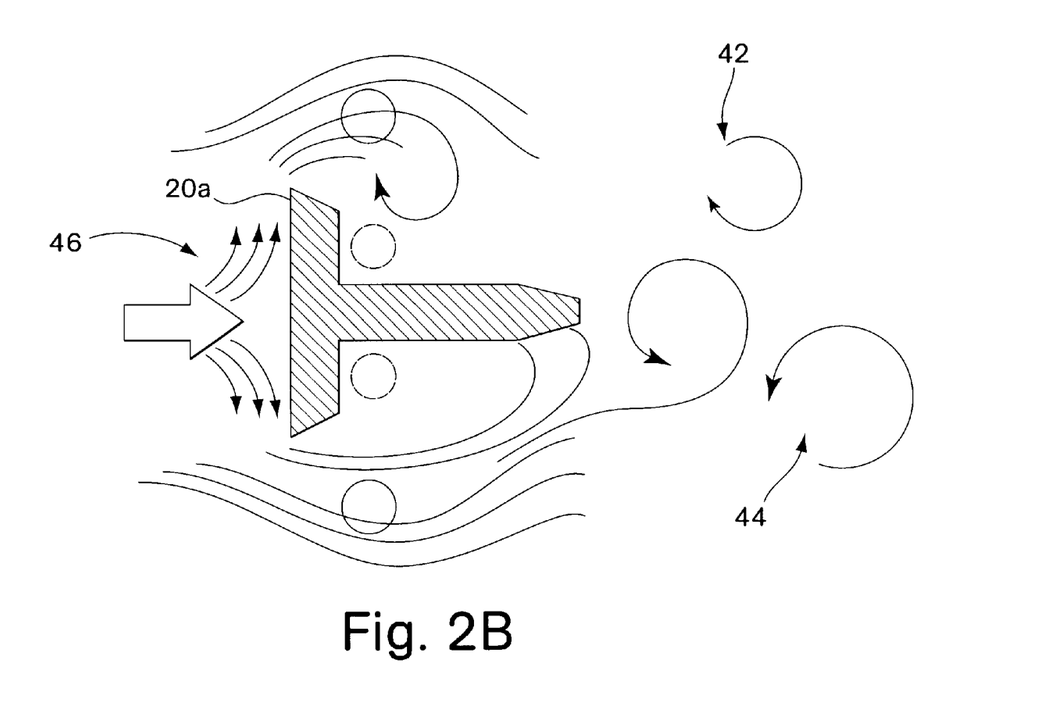
FIG. 2b shows a top view, along section line AA', of the vortex shedder of the flowmeter of FIG. 1, and illustrates the obstructing to the passage of a process fluid, and induced vortices that detach from the shedder and move downstream.

FIG. 2b shows formation of two streams of vortices 42 and 44 as a process fluid 46 strikes the blunt face 20a of the vortex shedder 20. At fluid velocities above a selected threshold, the vortices detach from the shedder, and shed downstream, alternating from one side of the shedder to the other. Because the shape of the shedder is important in producing stable streams of such vortices, the coating of the surfaces of the shedder only minimally distorts its contours. In particular, the coating is thin enough, approximately a few millimeters, to preserve the geometry of the tapered edge of the shedder, and to preserve other geometrical vortex-producing structural features, thus preserving the stability and the accuracy of the flow velocity measurements.

Figure 1A:
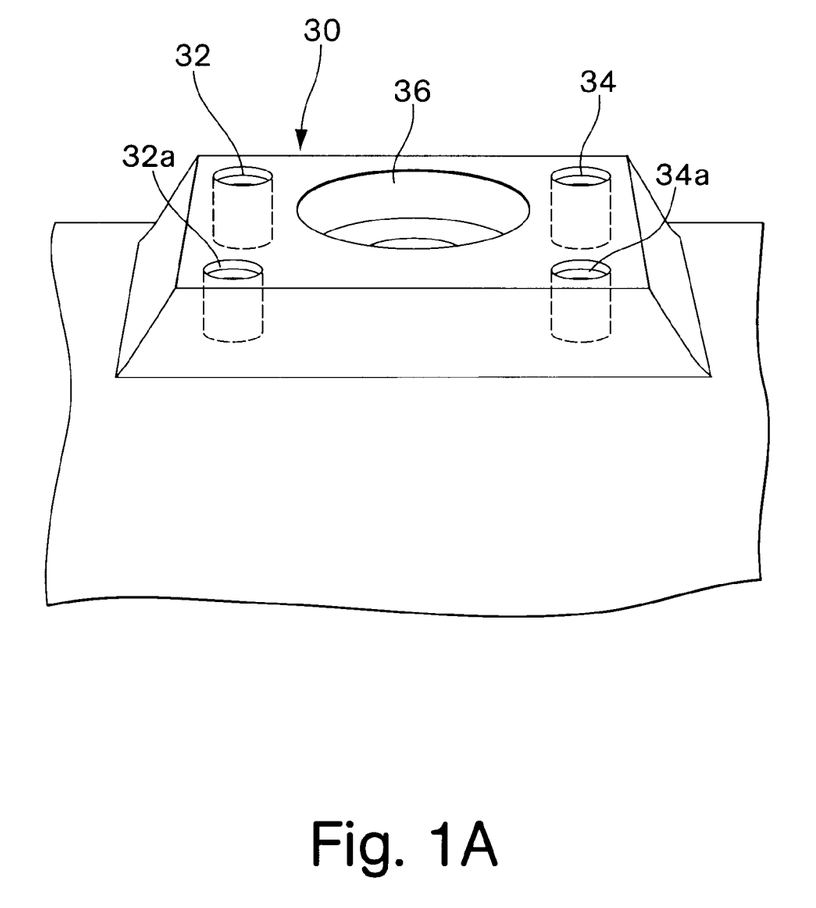
FIG. 1a is a fragmentary perspective view of a raised flat boss portion that the flowmeter of FIG. 1 can optionally include.

Referring to FIGS. 1 and 1a, a further and optional structural feature of the illustrated flowmeter 10 is that the outer wall 14 of the pipe 12 has a raised flat boss 30 having four radially extending threaded holes 32, 32a and 34, 34a. An aperture 36 formed in the flat boss 30 provides access to a cavity 40 that extends inwardly toward the shedder 20 and that accommodates a sensor 38.

Figure 1B:
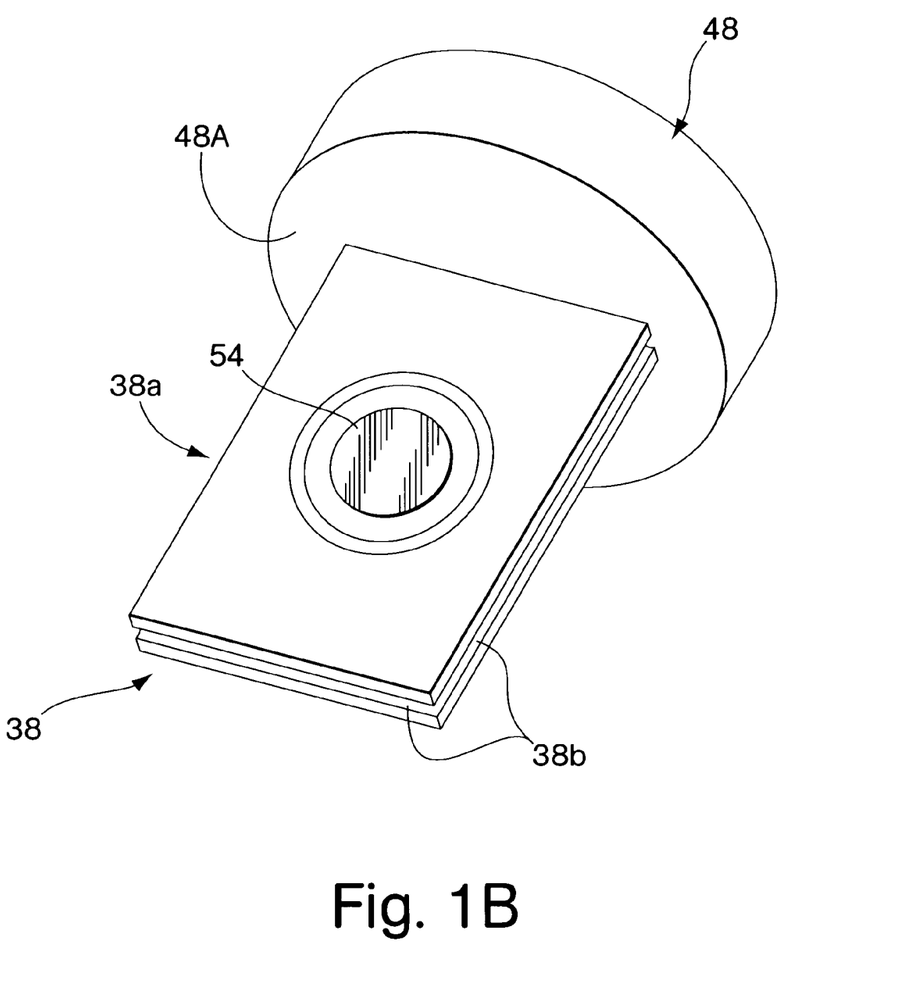
FIG. 1b is a perspective view of the sensor of FIG. 3, illustrating a groove for disposing a gasket therein, where the gasket provides a seal between the sensor and the inner surfaces of the cavity in which the sensor is disposed.

FIG. 1b shows that the sensor 38 includes a body portion 38a, integrally connected to a disk 48. The illustrated body portion 38a is recessed with a peripheral seal-mounting a groove 38b on three of its surfaces. Various sensors for vortex flowmeters are known in the art. For example, one practice of the invention employs the sensors utilized in the Foxboro 83 Series vortex flowmeters. One preferred embodiment of the illustrated flowmeter 10 employs a sensor having two diaphragms facing each other that transmit a pressure differential across the sensor to a piezoelectric element. In a vortex flow meter, each induced vortex corresponds to a localized area of low pressure. Because the set of induced vortices are staggered with respect to each other, the passage of a vortex over any of the two diaphragms produces a differential pressure across the sensor. This differential pressure causes the piezoelectric element to produce an electrical signal, thereby indicating the passage of the vortex over the sensor.

Figure 3:
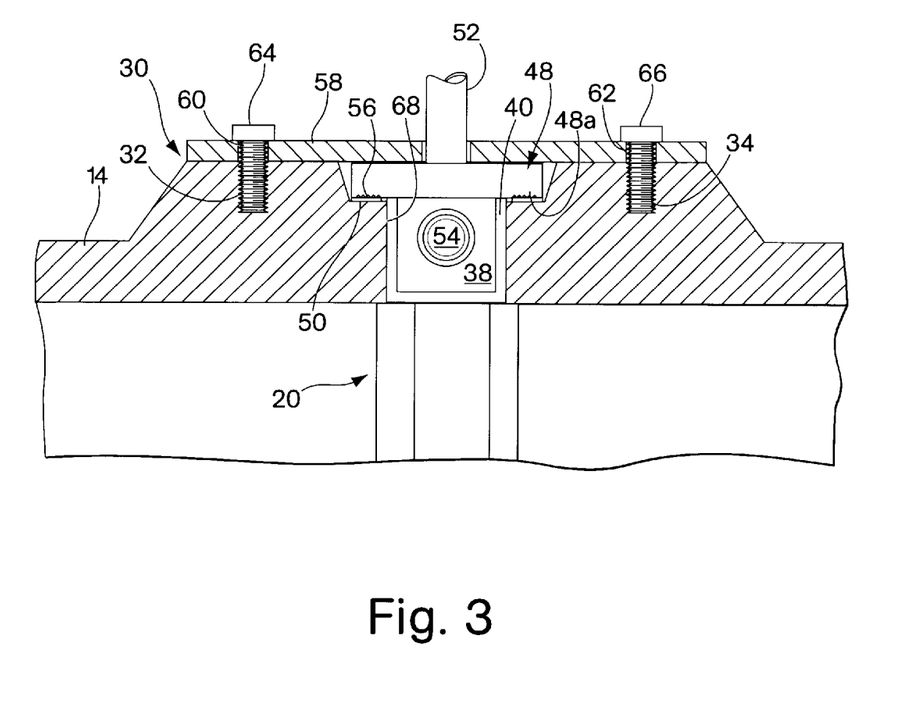
FIG. 3 is a cross sectional view of the flowmeter of FIG. 1 and illustrates the seating of the sensor in a cavity above the shedder, and the coating of the fluid accessible surfaces of the cavity in which the sensor resides.

The cross-sectional view of FIG. 3 shows one illustrative seating of the sensor 38 in the cavity 40 over the shedder 20. The integral disk 48 of the sensor 38, which can have an optionally serrated annular seating surface 48a, lies above a portion 50 of the surface of the flat boss 30 to support seating and sealing of the sensor 38 in the cavity 40. A conduit 52 is attached to the sensor 38 and houses a plurality of conductors (not shown) for transferring the electrical signals that the sensor produces to an electronic detection unit (not shown). A diaphragm 54 of the sensor 38 is responsive to localized pressure fluctuations that the induced vortices produce. Another diaphragm of the sensor 38 (not shown) lies directly behind the diaphragm 54. The two diaphragms detect a pressure differential across the sensor as a result of the passage of a vortex.

In a preferred practice of the invention, as shown in FIGS. 1a, 1b, and 3, a gasket 56 typically Teflon or metal, disposed between the lower surface of the sensor 38 and the portion 50 of the surface of the flattened boss 30, produces a seal between the sensor 38 and the surface 14. A bonnet 58 has four openings, of which two 60 and 62 are shown, that can be placed in register with the threaded holes 32,32a, and 34, 34a. The four openings through the bonnet 58 receive four mounting bolts, of which two 64 and 66 are shown. Upon threading of the bolts in the holes 32, 32a, 34, and 34a, the bonnet 58 presses against the upper surface of the sensor 38 to compress the gasket 56, to produce a seal between the sensor and the outside environment. The groove 38b can seat a metal or Teflon gasket or the like to provide a seal between the sensor and the inner surface 68 of the cavity 40. In addition, the gasket disposed in the groove 38b isolates the two diaphragms of the sensor 38 from each other, and prevents or minimizes "cross talk" between the diaphragms. The isolation of the diaphragms from each other allows each diaphragm to be responsive to one stream of the induced vortices, essentially without interference from the other stream.

The inner surface 68 of the cavity 40 is accessible to the process fluid. Thus, one practice of the invention coats the surface 68 with a layer of a fluorocarbon polymer, preferably PFA. In addition, the sensor 38 has a number of fluid accessible surfaces, such as the surface that includes the diaphragm 54. The diaphragms of the sensor are flexible to be responsive to pressure fluctuations that the vortices produce. Coating of the diaphragms may result in stiffening of the diaphragms and a loss of their flexibility. Thus, one preferred practice of the invention does not coat the fluid-accessible surfaces of the sensor. All non-transducing fluid-accessible surfaces other than those of the sensor are, however, coated with a fluorocarbon layer. The surfaces of the sensor constitute a small fraction of the total surface area of the fluid-accessible surfaces of the flow meter. Accordingly, only a very small volume fraction of the process fluid, flowing through the flow meter, contacts the surfaces of the sensor. In addition, construction of the sensor before installment into the flowmeter preferably includes polishing the surfaces of the sensor other than those of the diaphragms before attaching the diaphragms onto the sensor. Such polishing minimizes entrapment and/or contamination of the process fluid as a result of contact of the fluid with the surfaces of the sensor. Thus, not coating the fluid-accessible surfaces of the sensor does not have an appreciable effect on contamination of the process fluid.

The lack of coating of the sensor provides certain advantages in regard to construction and maintenance of the flow meter of the invention. In particular, not coating the sensor reduces the cost of manufacture, and also renders replacement of the sensor, which may be necessary at times, less costly.

Figure 4:
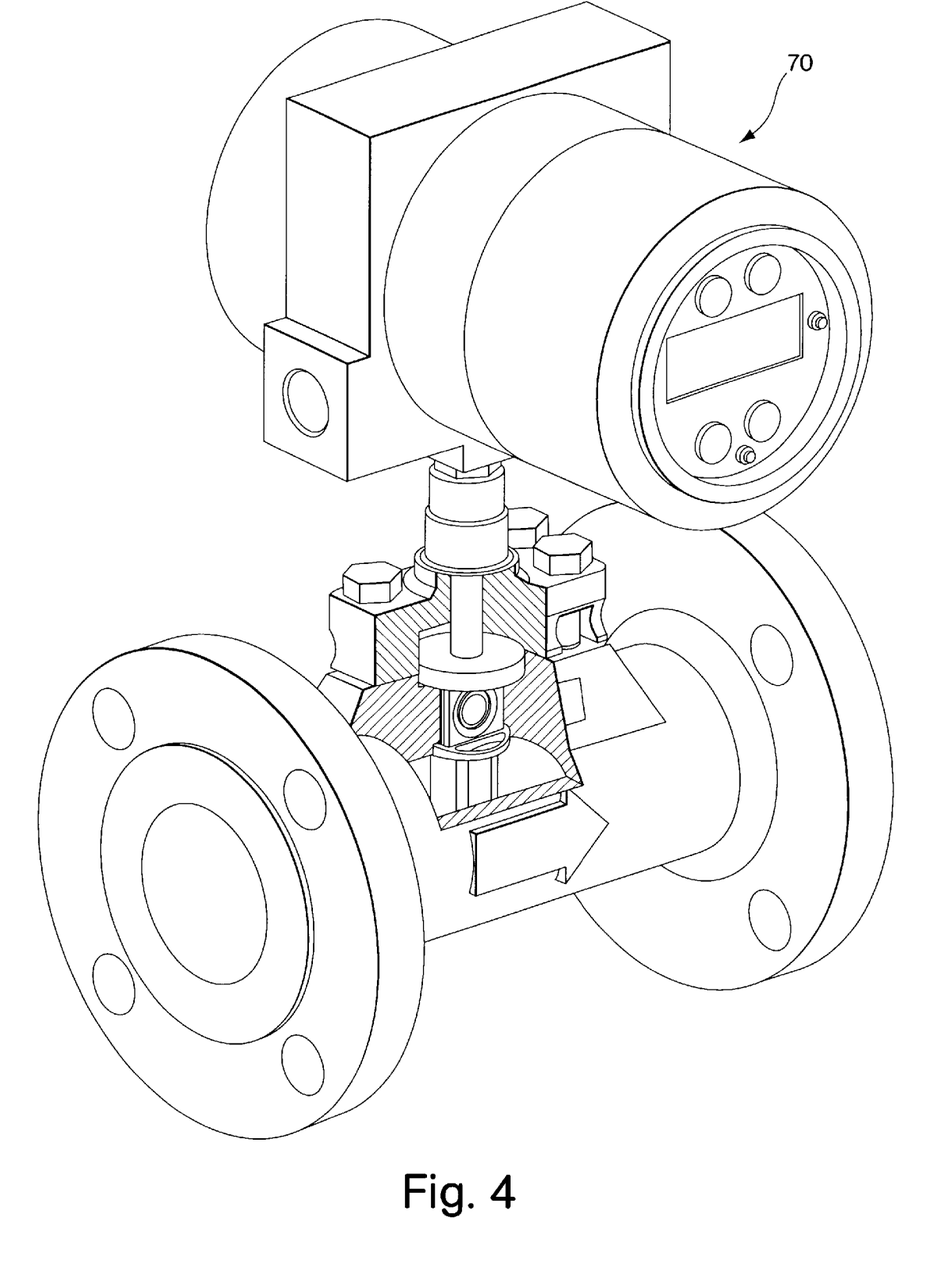
FIG. 4 is a partly cut-away perspective view of the vortex flow meter of invention, fully assembled to be used in the field.

One preferred method for manufacturing the vortex flowmeter of the invention produces the tubular pipe and the vortex shedder as an integral unit through a casting process known in the art. The term unit herein refers to the structure including the tubular tube 12 and the shedder 20. Subsequently, one preferred practice of the invention utilizes the coating methods disclosed in the aforementioned '403 patent to coat all the fluid-accessible surfaces of the tubular pipe and the shedder with a continuous layer of PFA. After the completion of the coating process, the sensor 38 is assembled with the tubular passage and the shedder as described in connection with FIG. 3. An electronic module 70, as shown in FIG. 4, is then attached and connected electronically to the sensor 38. The electronic module receives electrical signals that the sensor produces in response to the passage of the induced vortices to measure the frequency of the vortices, and to calculate the flow velocity of the process fluid. The construction of electronic units for vortex flow meters is well known in the art. For example, the invention can utilize the electronic module of the Foxboro 83 Series vortex flowmeters. After assembly of the electronic module and testing, the flowmeter is ready for use.

As described above, one preferred practice of the invention employs the coating techniques disclosed in the aforementioned '403 patent to coat the fluid-accessible surfaces of the flow meter. An initial step of the coating process preferably employed by the invention includes cleaning the fluid-accessible surfaces according to known methods in the coating industry. A subsequent step blasts the surfaces with grits of silica or aluminum oxide. The blasting process employs very fine grit material that pits the surfaces, but does not remove substantial amount of material from the surfaces. Thus, the blasting process does not appreciably alter the geometry of vortex-producing structures. The blasting roughens the surfaces to enhance the bonding of a resin to the surfaces. The surfaces are then cleaned of debris from the roughening steps, typically by vacuum followed by a wipe or fresh water. Within twelve hours of blasting, the unit is "baked" in an oven in an air atmosphere to bring the temperature of the fluid-accessible surfaces up to 740° F. The surfaces are held at this temperature between one and eighteen hours. The baking of the surfaces ensures the removal of certain contaminants which may be trapped within the interstitial structures of the surfaces.

The above practice of the invention, after the baking step, applies a primer coating to the fluid-accessible surfaces of the unit by spraying such surfaces with dry powder mixture of PFA and silicon carbide. The spraying is done after removing the unit from the oven, and before the temperature of the surfaces fall below about 680° F., as measured for example by thermocouples. The thickness of the coating after this initial stage is preferably within the range of about 0.002 inches to about 0.005 inches (0.005 cm to 0.0125 cm). If additional primer coating is needed, the assembled unit is returned to the oven to raise the temperature of the surfaces to about 700° F. Subsequently, the unit is removed from the oven, and a second layer of primer coating is sprayed on the fluid-accessible surfaces, over the first layer. The previous steps can be repeated until the desired thickness of the primer coating is obtained.

After coating the surfaces with the primer layers, the assembled unit is again heated, to raise the temperature of the surfaces to about 700° F. The unit is then sprayed with a layer of topcoat resin while the surface temperatures are at or above 575° F. One preferred practice of the invention employs an electrostatic spraying apparatus to spray the topcoat resin onto the fluid-accessible surfaces. Successive layers of topcoat resin can be spray-applied to the surfaces as long as the surfaces are maintained within the elevated temperature range specified for the coating resin.

One alternative to the foregoing dry-powder spray technique for manufacturing a flowmeter having a polymer coating as described above employs a wet-powder application technique. In this alternative method, each layer of the resin is sprayed on the fluid-accessible surfaces as a wet powder while the surfaces are held at a cure temperature. The details of this wet spraying application are described in the '403 patent, and hence are not repeated here.

It will thus be seen that the invention efficiently attains the objects set forth above, including providing a fluorocarbon coated flow meter suitable for ultra-pure applications. Since certain changes may be made in the above constructions and the described methods without departing from the scope of the invention, it is intended that all matter contained in the above description or shown in the accompanying drawings be interpreted as illustrative and not in a limiting sense.

Having described the invention, what is claimed as new and protected by Letters Patent is:

1. A flow meter having (i) a tubular passage for containing a fluid flow to be measured and having fluid accessible surfaces, (ii) a flow obstruction element with fluid accessible surfaces at least partly in said passage for producing a stream of vortices, and (iii) a sensor element having fluid accessible surfaces and located spaced from said obstruction element for producing electrical signals responsive to said vortices, said flow meter comprising, a flourocarbon polymer layer continuously and smoothly coating all said fluid accessible surfaces other than the fluid-accessible surfaces of said sensor element for protecting fluid flowing within the passage from contamination by said fluid accessible surfaces, said layer coating said surfaces with a configuration that sustains the flow-measuring operations of said passage and of said obstruction element and of said sensor element.

2. A flow meter according to claim 1, wherein said polymer layer has a selected imperviousness to said fluid.

3. A flow meter according to claim 1, wherein said polymer layer preserves the geometry of said flow obstruction element.

4. A flow meter according to claim 1, wherein said fluorocarbon polymer comprises perfluoroalkoxy tetrafluoroethylene.

5. A flow meter according to claim 1, wherein said fluorocarbon polymer comprises an admixture of perfluoroalkoxy tetrafluoroethylene with an inorganic material selected from the group consisting of a nitride, an oxide, a diboride, and a carbide of silicon, of zirconium, of tungsten or of boron, or a polyether.

6. A flow meter of the flow obstruction type adapted for ultra pure applications and comprising

- a tubular passage for carrying a flowing fluid, said tubular passage having a wall with an axially-extended tubular inner surface accessible to the fluid and having at least one mounting flange at an axial end thereof with a radially extending flange surface,
- an obstruction element disposed within said tubular passage and having an elongate portion with flow accessible surfaces forming a partial obstruction in said passage, said elongate portion having a fluid accessible blunt face for producing a set of spaced apart vortices for measuring flow rate of fluid through said tubular passage,
- a sensor disposed within said tubular passage in a cavity above said obstruction element for producing electrical signals in response to said vortices, said sensor having fluid-accessible surfaces that include two diaphragms responsive to pressure fluctuations caused by said vortices, and,
- a liquid-impervious layer of a fluorocarbon polymer continuously and smoothly coating all of said fluid-accessible surfaces other than the fluid-accessible surfaces of said sensor and at least a portion of said flange surface to preclude contamination of the flowing fluid from said surfaces, said coating of said obstruction element being sufficiently thin to prevent distortion of the shape of the said obstruction element.

7. A flow meter according to claim 6, wherein said flow obstruction element is integrally cast within said tubular passage.

8. A flow meter according to claim 6, wherein said obstruction element has an axially-facing blunt surface and an opposed axially-facing tail portion.

9. A flow meter according to claim 6, wherein said tubular passage comprises a stainless steel tube.

10. A flow meter according to claim 6, wherein said fluorocarbon polymer consists essentially of perfluoroalkoxy tetrafluoroethylene.

11. A flow meter according to claim 6, wherein said fluorocarbon polymer comprises an admixture of perfluoroalkoxy tetrafluoroethylene with an inorganic material selected from the group consisting of a nitride, an oxide, a diboride, and a carbide of silicon, of zirconium, of tungsten or of boron, or a polyether.

* * * * *